July 10, 1962  A. G. JANUS  3,043,207
REMOVABLE CLOSURE FOR WRAPPED BREAD
Filed Feb. 4, 1957
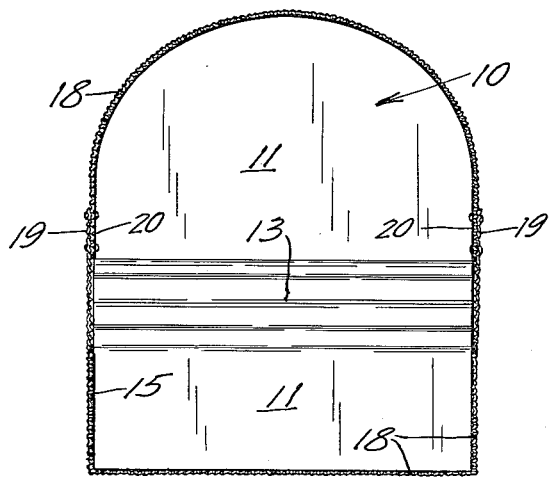
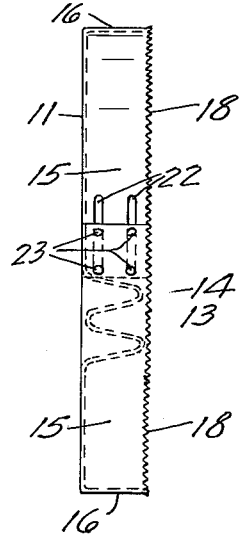
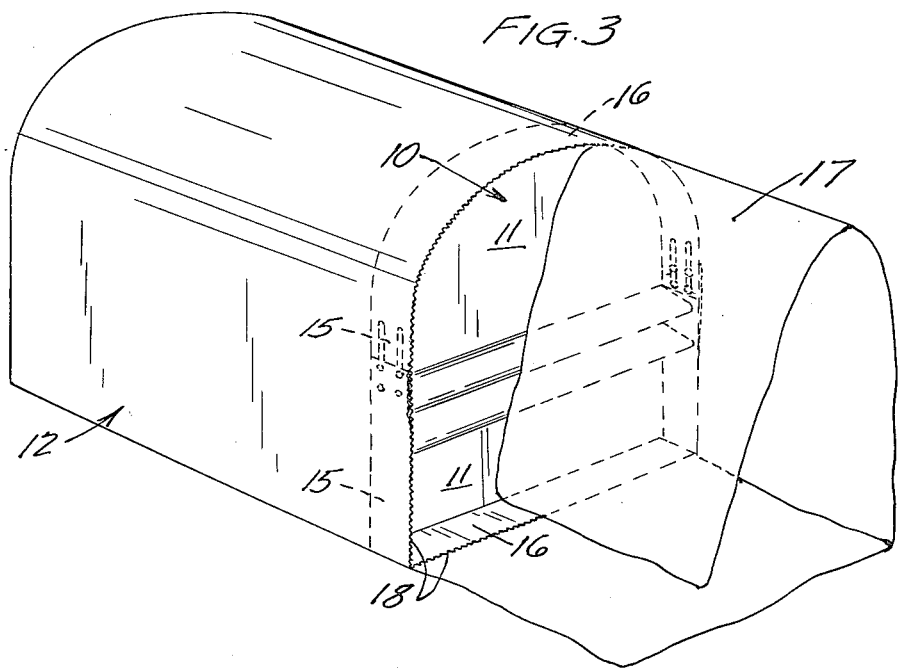
INVENTOR.
ALEXANDER G. JANUS
BY
Williamson, Schroeder, Adams & Meyers
ATTORNEYS 3,043,207
REMOVABLE CLOSURE FOR WRAPPED BREAD
Alexander G. Janus, Rochester, Minn., assignor to Consumers Merchandising Corporation, Rochester, Minn., a corporation of Minnesota
Filed Feb. 4, 1957, Ser. No. 637,942
8 Claims. (Cl. 99—234)

This invention relates to a device for maintaining wrapped bread in proper condition for serving directly from its wrapper.

It is a general object of the invention to provide a device which will cooperatively form a closed package together with the conventional wrapper of a loaf of bread at all times between periods of actual removal of individual slices of bread.

Another object of the invention is to provide a holder and closure for pre-sliced bread as it is progressively dispensed from its wrapper together with means associated with the holder and closure to grip the wrapper and to permit easy removal of excess wrapper material as the slices of bread are removed.

A still further object of the invention is to provide an inexpensive and efficient device of the class described which has a neat and unobtrusive appearance in attached condition within the wrapper and a loaf of bread and which renders practical the serving of bread upon a table directly from its wrapper.

These and other objects and advantages of my invention will more fully appear from the following description, made in connection with the accompanying drawings, wherein like reference characters refer to the same parts throughout the several views and in which:

FIG. 1 is a front view of my device in relaxed condition preparatory to inserting within the wrapper of a partly used loaf of bread;

FIG. 2 is a side elevation of the device taken from the left in FIG. 1; and

FIG. 3 is a perspective view of a loaf of bread with my device inserted within the wrapper and against the bread, a portion of bread wrapper having been torn away on the toothed periphery of the holder.

With continued reference to the drawing, my device has a main sheet body portion indicated generally at 10, which is constructed of stiff and resilient material and presents a generally flat configuration, as shown in FIGS. 1 and 2. The rear surface 11 of the body 10 presents a generally flat plane adapted to contact the end of a loaf of wrapped bread 12, as shown in FIG. 3. Body 10 may be constructed of plastic or metal material having at least portions with sufficient resilience to spring back into shape after having been deformed.

The sheet body 10 is continuous and has a resilient pleated area 13 formed medially of the ends and extending from one side to the other of the body 10. The pleated area 13 may be formed of a plurality of open folds 14 such as may provide a hand grip and permit compression by the fingers to shorten the overall length of the body. To accomplish this purpose, the folds 14 may conveniently extend forwardly of the plane 11, as shown in FIG. 2.

Secured peripherally or formed integrally with the body 10 is a flange or band 15. The band or flange 15 lies to each side of the pleated area 13 and has forward extension from plane 11 of body 10, as shown in FIG. 2. The flange 15 presents an outer facing area 16 which is adapted to bear against the inside of wrapper 17 of a loaf of wrapped bread 12, as shown in FIG. 3. The forward edge of band or flange 15 is provided with outwardly extending serrations or teeth 18 and these may be outwardly inclined so as to pierce, or assist in piercing, the wrapper 17 when placed therewithin. The teeth or serrations 18 need not penetrate the wrapper but may be useful merely to assist in frictionally binding the device in its mounted position.

Flange 15, in order to present a continuous tearing edge, may be securely fastened edgewise to body 10 up to the ends of the resilient pleated area 13 at each side thereof and then may separate into overlapping portions 19 and 20, one or both of which may be provided with teeth or serrations 18 to continue the tearing edge about the periphery of the entire device. In the instant case, the flange portion 19 lies in sliding contact exteriorly of the flange portion 20. Since the pleated area 13 is flexible, it is sometimes desirable to maintain the portions of body 10 at each side of pleated area 13 in the same plane 11 at all times. In order to accomplish this, guide means may be employed at the overlapping flange portions 19 and 20 as shown in FIG. 2. Guide means may conveniently take the form of groove or slot members 22 formed in flange 15 in the area 20, and abutments 23 pressed in, or formed from, the flange portions 19 so as to ride in slot members 22 whenever resilient pleated area 13 is compressed to retract the parts.

In use, the loaf of wrapped bread 12, having been previously opened, provides an open end through which air can normally pass, thereby drying the end of the bread loaf from which slices are removed. My device is manually gripped by the pleated or folded portion 13 and compressed between the fingers so as to cause the overlapping portions 19 and 20 of bands or flanges 15 at each side of the pleated area 13 to converge slightly. At the same time, because of guide means, the body 10 maintains its inwardly facing surface 11 in the previously noted plane. With the flanged portions 15 in overlapped and converged condition, the entire device is inserted within the bread wrapper 17 so as to have its inner plane surface 11 in contact with, or closely adjacent, the exposed end of the bread loaf 12. The pleated folds are then released and the resilience of the body material causes the bands or flanges 15 at each side of pleated area 13 to expand outwardly and frictionally grip the inner surface of wrapper 17. The serrated or toothed edge 19 bears against the wrapper 17 and provides a tearing edge for removing the excess wrapper, as shown in FIG. 3. Even with the excess wrapper removed, enough remains to firmly surround the flange or band 15.

It may thus be seen that the mounted device provides a closure for wrapped bread irrespective of the quantity of bread remaining in the package. Each time the device is used, the excess wrapper 17 may be torn therefrom without affecting the closed or sealed nature of the combination. The wrapper and its closure provide a neat appearance in addition to maintaining the bread in easily dispensed and fresh condition.

It will, of course, be understood that various changes may be made in the form, details, arrangement and proportion of the parts without departing from the scope of my invention.

What is claimed is:

1. A device for maintaining wrapped bread in easily dispensed fresh condition comprising, a generally flat body of stiff and resilient material providing a continuous web adapted to traverse completely the area defined peripherally by the bread wrapper and having a rearwardly facing surface adapted to lie closely adjacent an exposed end of a bread loaf, said flat body having a forwardly extending peripheral band providing an outwardly facing bearing surface for removably pressing against the inner surface of said bread wrapper, and sharp edge means extending outwardly from said band and providing a tearing edge for progressively removing excess wrapper material as the loaf of bread is consumed.

2. A device for maintaining wrapped bread in easily dispensed and fresh condition comprising, a sheet having a resiliently expandible area adapted to overlie an exposed end surface of bread within its wrapper, a transverse flange formed substantially about the periphery of said area and adapted to bear outwardly against the inside surface of said wrapper when the device is in mounted position, and means edgewise of said flange for pressing outwardly on said wrapper and providing a tearing edge for excess wrapper material, said device remaining in mounted position after the excess wrapper is torn away.

3. A device for maintaining wrapped bread in easily dispensed and fresh condition comprising, a continuous and generally flat sheet of resilient material having a medial pleated portion extending from one side to the other to provide longitudinal compressibility, and a flange joined edgewise to the flat continuous sheet, said flange providing a bearing surface for frictionally engaging the inner surface of a bread wrapper to provide a closure therewith to protect the progressively exposed end of a loaf of bread.

4. A device for maintaining wrapped bread in easily dispensed and fresh condition comprising, a generally flat body of stiff and resilient material providing a continuous web adapted to traverse completely the area defined by the bread wrapper and having a rear face adapted to lie closely adjacent an exposed end of a bread loaf, said flat body having a peripheral band extending forwardly of the margin of said body and providing an outwardly facing bearing surface for releasably pressing against the inner surface of said bread wrapper, and a toothed terminal formed forwardly on said band for penetrating and defining a tear line for progressively removing excess wrapper as the loaf of bread is consumed.

5. A device for maintaining wrapped bread in easily dispensed and fresh condition comprising, a continuous sheet of resilient material providing a generally flat plane and having a folded portion extending forwardly of said plane and providing a compressible finger grip for holding and diminishing the length of said device, and a flange formed forwardly of said plane and periphery thereof for releasibly engaging in frictional contact the inner surface of the bread wrapper while providing a closure therewith to protect the progressively exposed end of a loaf of bread.

6. A device for maintaining wrapped bread in easily dispensed and fresh condition comprising, a continuous and generally flat sheet of resilient material having a medial pleated portion extending from one side to the other to provide longitudinal compressability, and a laterally extending flange formed peripherally about the edge of the continuous sheet and having extensibility in a direction lateral to the pleats of said pleated portion adjacent each end thereof, said flange providing a bearing surface for frictionally engaging the inner surface of a bread wrapper to provide a closure therewith and to protect the progressively exposed end of a loaf of bread.

7. A device for maintaining wrapped bread in easily dispensed and fresh condition comprising, a continuous and generally flat sheet of resilient material having a medial pleated portion extending from one side to the other to provide longitudinal compressability, and a flange formed laterally along the edge of said sheet and having free ends lying in overlapped relation adjacent each end of the medial pleated portion, and guide means cooperatively formed between the overlapped ends of said flange whereby to maintain said continuous sheet in a flat plane when compressed and released whereby the device may be inserted in an open end of a loaf of bread to permit said flange to frictionally engage the inner surface of the bread wrapper and provide a closure therewith.

8. A device for maintaining wrapped bread in easily dispensed and fresh condition comprising, a pair of flat protective sheet portions having areas disposed substantially in the same plane and adapted to lie within the wrapper of an opened loaf of bread in contact with a cut surface thereof, said sheet portions having peripheral abutment means adapted to contact the inner surface of the wrapper immediately adjacent the cut bread surface, and resilient means secured cooperatively to both of said sheet portions and urging them divergently in said same plane whereby to press the peripheral abutment means into wrapper-contacting and bread-covering relation.

References Cited in the file of this patent

UNITED STATES PATENTS

| | | |
|---|---|---|
| 1,481,700 | Fatland | Jan. 22, 1924 |
| 2,622,760 | Kissig | Dec. 23, 1952 |
| 2,726,440 | Jowers | Dec. 13, 1955 |
| 2,791,273 | Brownell | May 7, 1957 |

FOREIGN PATENTS

| | | |
|---|---|---|
| 611,263 | France | July 3, 1926 |
| 529,657 | Germany | Apr. 23, 1930 |